April 20, 1943.  A. M. WOLF  2,317,324
MOTOR VEHICLE DRIVING MECHANISM
Original Filed May 18, 1932
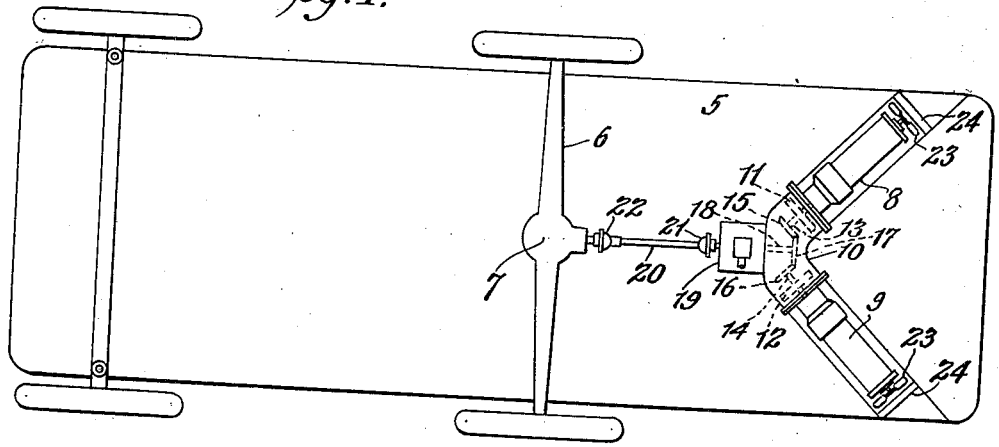
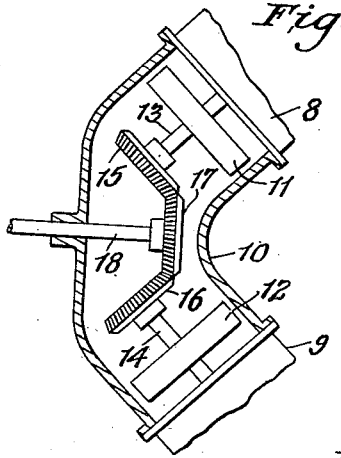
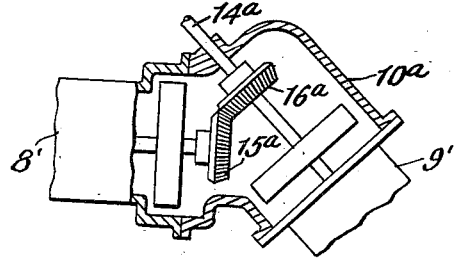
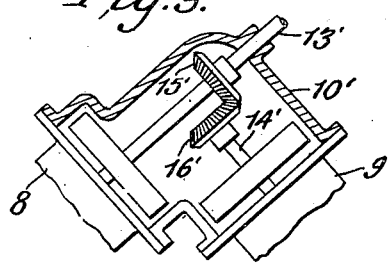
INVENTOR.
Austin M. Wolf,
BY M. C. Lyddane
ATTORNEY.

Patented Apr. 20, 1943

2,317,324

UNITED STATES PATENT OFFICE 2,317,324

MOTOR VEHICLE DRIVING MECHANISM

Austin M. Wolf, Plainfield, N. J.

Application August 1, 1939, Serial No. 287,705, which is a division of application Serial No. 73,584, April 9, 1936, which is a continuation of application Serial No. 612,057, May 18, 1932. Again divided and this application March 28, 1941, Serial No. 385,607

4 Claims. (Cl. 180—54)

This invention relates to motor vehicle driving mechanism, the subject matter of the present application being a division of my pending application for patent Ser. No. 287,705 filed August 1, 1939, now Patent No. 2,238,616, issued April 15, 1941, which application is a division of application Ser. No. 73,584 filed April 9, 1936, now Patent No. 2,185,165, issued December 26, 1939, the said latter application being a continuation of my original application for patent Ser. No. 612,057 filed May 18, 1932.

The present invention relates more particularly to that general class of motor vehicle driving mechanism in which the power plant is mounted rearwardly of the vehicle driving axle and is operatively connected in comparatively closely coupled relation with the conventional differential axle drive means with a view to obtaining a more direct transmission of power and a reduction of power losses to a minimum.

It is a more particular object of the present invention to provide a drive mechanism of this type in which a dual engined power plant is employed with a novel space conserving arrangement of the engines, power transfer means and variable speed transmission mechanism.

In one embodiment of the invention, I propose to mount the two engines of the power plant behind the rear vehicle axle with the crank shaft axis of one engine disposed in diagonal relation to the crank shaft of the other engine and to provide a single power transfer gearing connecting said engine crank shafts with a common variable speed transmission gearing.

It is another object of the invention to arrange said engines with their opposed ends in closely adjacent relation and to provide a gear box or housing for the power transfer gearing rigidly uniting the said ends of the engines with each other.

It is also a more specific object of the invention in one embodiment thereof to mount the two engines behind the rear vehicle axle on relatively opposite sides of the vehicle center line and with the longitudinal axis of each engine crank shaft extending in diagonal relation to said center line and providing power transfer gearing on the center line of the vehicle operatively connecting said engine crank shafts with the propelling means for the vehicle axle.

With the above and other objects in view, the invention consists in the improved motor vehicle driving mechanism and in the construction and relative arrangement of the several parts thereof, as will hereinafter be more fully described, illustrated in the accompanying drawing and subsequently incorporated in the subjoined claims.

In the drawing wherein I have disclosed several simple and practical embodiments of the present invention, and in which similar reference characters designate corresponding parts throughout the several views:

Fig. 1 is a plan view diagrammatically illustrating the rear end portion of a vehicle body and showing one mounting or arrangement of the dual engined power plant, the variable speed transmission and propelling connection between the same and the rear axle differential.

Fig. 2 is a fragmentary plan view, the power transfer gear box or housing being shown in section.

Fig. 3 is a similar view showing a modified form of the device, and

Fig. 4 is a similar view showing a further alternative construction.

Referring in detail to the drawing, 5 indicates the rear end portion of a motor vehicle body, 6 the rear drive axle housing and 7 the differential mechanism, which, in the present instance, is shown arranged on the longitudinal center line of the vehicle.

The power plant is suitably mounted in rearwardly spaced relation from the differential 7 and includes the two internal combustion engines 8 and 9 respectively. As shown in Figs. 1 and 2 of the drawing, these engines are arranged on opposite sides of the vehicle center line and with their crank shaft axes disposed at angles of substantially 45° with relation thereto and, therefore, in 90° angular relation to each other. The inner ends of the engine cylinder blocks are disposed closely adjacent to each other and are rigidly connected by the gear box or housing 10 for the power transfer means.

As herein shown, I provide the separate clutches 11 and 12 respectively for releasably connecting the power output shafts 13 and 14 respectively with the respective engine crank shafts. Any suitable means may be provided for independently operating said clutches so that the vehicle may be driven by either one or both engines. Beveled gears 15 and 16 fixed to the respective shafts 13 and 14 have meshing engagement with a common beveled gear 17 fixed to the power take-off shaft 18 mounted in the gear box 10 and extending exteriorly thereof and having driving connection with the variable speed transmission mechanism contained in the longitudinally disposed housing 19 which may be integrally formed with or rigidly connected to the gear box 10. The propelling shaft 20 is flexibly connected at its opposite ends as at 21 and 22 respectively with the output side of the transmission mechanism and with the axle differential 7, which permits of relative movement between the sprung and unsprung parts of the vehicle drive.

In the present instance I have shown the diagonally disposed engines extending rearwardly from the power transfer gearing so that the rear ends of said engines are located adjacent opposite sides of the vehicle. The usual air circulating fans 23 are provided in conjunction with the water circulating radiators 24 for each engine which are suitably mounted on the opposite side walls of the vehicle.

In Fig. 3 of the drawing, I have shown a slightly different arrangement, eliminating the separate power take-off shaft 18 and which permits of a closer relationship between the inner ends of the engines 8 and 9 with a smaller transfer gear box or housing. In this case, the power output shaft 13' of the engine 8 is extended entirely through the gear box and adapted to be operatively coupled in driving relation with the power transmission mechanism. This shaft carries the beveled gear 15' in direct meshing engagement with the gear 16' fixed to the power output shaft 14' of the other engine 9. Thus the gear box or housing 10' is relatively short and the inner ends of the engine cylinder blocks connected thereby are disposed in very close relationship with each other.

In Fig. 4 of the drawing, I show one of the engines 8' mounted in the vehicle frame with its crank shaft axis disposed at a 90° angle with respect to the center line thereof while the crank shaft of the other engine 9' is positioned at a 45° angle. In this case also, I use a relatively short gear box 10a connecting the closely adjacent inner ends of the engine cylinder blocks, and as in Fig. 3, the clutch driven power output shafts of the respective engines are directly connected by the beveled gears 15a and 16a. In this case, the clutch driven shaft 14a of the engine 9' is shown extending exteriorly of the gear box 10a for connection with the variable speed transmission mechanism.

From the foregoing description considered in connection with the accompanying drawing, it will be apparent that each of the above described arrangements of the dual engined power plant provides a compact and space conserving relationship between the two engine units, the power transfer means and the variable speed transmission so that driving power may be transmitted from one or both of the engines directly through the transmission and to the rear axle differential with a minimum loss of power. The present invention also provides a well balanced distribution of the sprung load with better adhesion and tractive effort of the rear driving wheels of the vehicle upon the road surface.

While I have herein described and illustrated several concrete examples of practical embodiments of my present invention, it is nevertheless to be understood that in each of the disclosed constructions, the combination, construction and relative arrangement of the various units and elements thereof are susceptible of more or less modification. Accordingly, this invention is not to be limited in these particulars, since its essential features may also be exemplified in various other alternative forms not herein specifically disclosed, but which may fairly be comprehended as within the spirit and scope of the appended claims.

I claim:

1. In motor vehicle driving mechanism, a power plant comprising a pair of engines horizontally positioned in adjacent relation with the crank shaft axis of one engine diagonally disposed relative to the crank shaft axis of the other engine, a common power transfer gear box rigidly fixed to the opposed ends of said engines, constantly meshed power output gears within said box, and independently operable clutches for selectively connecting the engine crank shafts with said power output gears to transfer the developed power of one or both of said engines through said gears.

2. In motor vehicle driving mechanism, a power plant comprising a pair of engines horizontally disposed with their crank shafts at an angle of 90° relative to each other, a power transfer gear box rigidly secured to adjacent ends of the engines, and power transfer means within said box including clutch driven gears in axial alignment with the respective crank shafts and independently operable clutches for drive connecting said gears with the crank shafts, a power output shaft centrally mounted in the gear box in angular relation to the engine crank shafts, and a gear on said output shaft in constant meshing engagement with the clutch driven gears.

3. In motor vehicle driving mechanism, a pair of engines mounted and arranged with the crank shaft of one engine in diagonally disposed relation to the crank shaft of the other engine, a power transfer gear case rigidly connecting said engines with each other, power output shafts mounted in said gear case in axially aligned relation with the respective engine crank shafts, directly intermeshing gears fixed to the respective power output shafts, and one of said power output shafts extending exteriorly of the gear case for connection with power transmission means between the engines and a vehicle driving axle.

4. In a motor vehicle driving mechanism, a power plant comprising a pair of engines mounted with the power shaft of one engine diagonally disposed relative to the power shaft of the other engine, a common power transfer mechanism for said engines, and independently operable clutches for selectively connecting said transfer mechanism with the respective engine power shafts to transfer the developed power of one or both of said engines through said mechanism.

AUSTIN M. WOLF.